US008612768B2

(12) United States Patent
West et al.

(10) Patent No.: US 8,612,768 B2
(45) Date of Patent: Dec. 17, 2013

(54) UNIQUE ACCOUNT IDENTIFICATION

(75) Inventors: Jeff West, Seattle, WA (US); Mark Sievert Larsen, Redmond, WA (US); Adrian Dragomir, Bellevue, WA (US); Dennis Kiilerich, Seattle, WA (US); Lingeshwaran Palaniappan, Bellevue, WA (US); Renata van Diest, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 657 days.

(21) Appl. No.: 12/350,892

(22) Filed: Jan. 8, 2009

(65) Prior Publication Data
US 2010/0174912 A1 Jul. 8, 2010

(51) Int. Cl.
*G06F 21/00* (2013.01)

(52) U.S. Cl.
USPC .......................................... 713/186

(58) Field of Classification Search
USPC .......................................... 713/183
See application file for complete search history.

(56) References Cited

U.S. PATENT DOCUMENTS

| | | | |
|---|---|---|---|
| 5,647,002 | A | 7/1997 | Brunson |
| 6,871,215 | B2 | 3/2005 | Smith et al. |
| 6,965,918 | B1 | 11/2005 | Arnold et al. |
| 6,983,308 | B1 | 1/2006 | Oberhaus et al. |
| 7,266,586 | B2 | 9/2007 | Lincke et al. |
| 7,376,701 | B2 | 5/2008 | Bhargava et al. |
| 7,660,852 | B2 * | 2/2010 | Flannery et al. ............... 709/204 |
| 2001/0037412 | A1 * | 11/2001 | Miloushev et al. ............ 709/315 |
| 2003/0177188 | A1 * | 9/2003 | Brubacher et al. ............ 709/206 |
| 2004/0024846 | A1 * | 2/2004 | Randall et al. ................ 709/219 |
| 2004/0153483 | A1 | 8/2004 | Cox |
| 2007/0150608 | A1 * | 6/2007 | Randall et al. ................ 709/228 |
| 2007/0159301 | A1 * | 7/2007 | Hirt et al. ...................... 340/10.1 |
| 2007/0159994 | A1 * | 7/2007 | Brown et al. .................. 370/324 |
| 2008/0046984 | A1 * | 2/2008 | Bohmer et al. ................... 726/5 |
| 2008/0109448 | A1 | 5/2008 | Aboel-Nil et al. |
| 2008/0120711 | A1 * | 5/2008 | Dispensa .......................... 726/7 |

OTHER PUBLICATIONS

Yegulalp, Serdar, "Synchronizing Multiple Exchange Email Accounts on One Smartphone", retrieved at http://searchexchange.techtarget.com/tip/0,289483,sid43_gci1265019,00.html, Jul. 20, 2007, Pages 3.

"How to Synchronize a Windows Mobile 2003 Device with the Exchange Server", retrieved at http://www.unibz.it/web4archiv/objects/pdf/standard/03_configuration_steps_for_exchange_activesync.pdf, Pages 3.

(Continued)

*Primary Examiner* — Kambiz Zand
*Assistant Examiner* — Abiy Getachew
(74) *Attorney, Agent, or Firm* — Alleman Hall McCoy Russell & Tuttle LLP

(57) ABSTRACT

A synchronization system includes a first account assigned a first unique identifier. Access to the first account is contingent on validation of a shared access credential. The synchronization system also includes a second account assigned a second unique identifier. Access to the second account is contingent on validation of the shared access credential. The synchronization system further includes a library of account operations. One or more account operations are configured to utilize the first unique identifier when addressing the first account, and one or more account operations are configured to utilize the second unique identifier when addressing the second account.

18 Claims, 4 Drawing Sheets

(56) References Cited

OTHER PUBLICATIONS

"How to Access your Exchange Mailbox from a Mobile Device", retrieved at http://iss.leeds.ac.uk/downloads/how42.pdf, Mar. 2007, pp. 1-5.

"Nokia Intellisync Mobile Suite Release Notes" retrieved at http://www.novell.com/documentation/groupwise_mobile_3/pdfdoc/NIMS9.0_ReleaseNotesEN/NIMS9.0_ReleaseNotesEN.pdf, Jun. 3, 2008, pp. 1-20.

* cited by examiner

FIG. 3

| ACCOUNT ITEMS | | GUID |
|---|---|---|
| MAIL | NEW MESSAGE 1 | 130 |
| | NEW MESSAGE 2 | 130 |
| | DRAFT 1 | 132 |
| | SENT MESSAGE 1 | 132 |
| CONTACTS | ADDRESS A | 130 |
| | ADDRESS B | 130 |
| | ADDRESS C | 132 |
| | ADDRESS D | 132 |
| | ADDRESS E | 132 |
| TASKS | TO DO 1 | 130 |
| | TO DO 2 | 130 |
| CALENDAR | MEETING 1 | 130 |
| | MEETING 2 | 132 |
| | APPOINTMENT 1 | 132 |

UNIQUE ACCOUNT IDENTIFICATION

BACKGROUND

Computing devices can be used to help organize a user's life. In particular, some users have replaced paper calendars, sticky notes, and paper mail with electronic substitutes offered by a personal computer or a personal data assistant. Some users have found that it can be useful to enter, edit, and/or view such information from one or more different computing devices. As such, robust and flexible synchronization capabilities can increase user productivity and satisfaction.

SUMMARY

A synchronization system is disclosed. The synchronization system includes a first account assigned a first unique identifier. Access to the first account is contingent on validation of a shared access credential. The synchronization system also includes a second account assigned a second unique identifier. Access to the second account is contingent on validation of the shared access credential. The synchronization system further includes a library of account operations. One or more account operations are configured to utilize the first unique identifier when addressing the first account, and one or more account operations are configured to utilize the second unique identifier when addressing the second account.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 3 shows an example of a shared table including a plurality of account items from different accounts.

DETAILED DESCRIPTION

Figure 1:
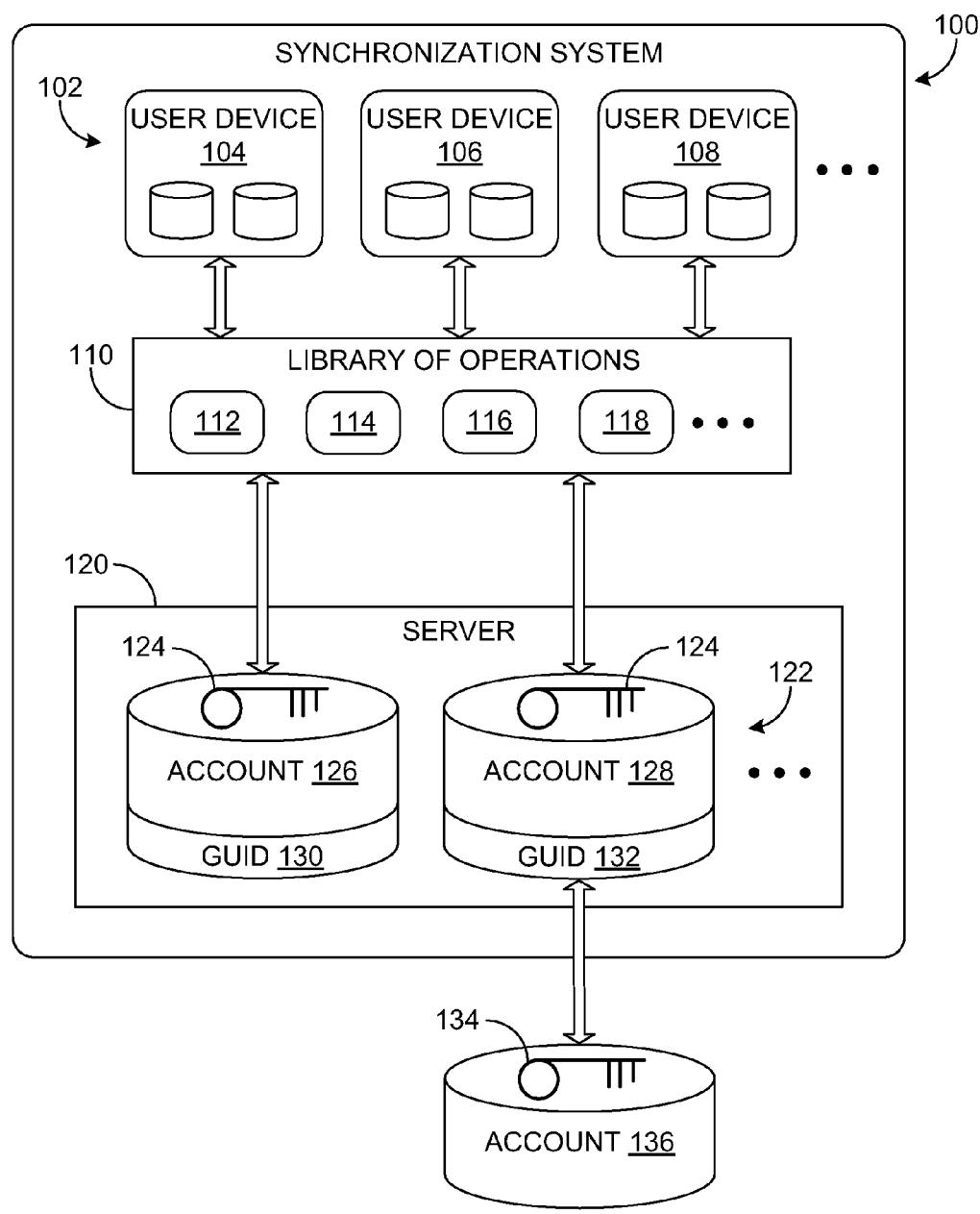
FIG. 1 shows an exemplary synchronization system.

FIG. 1 shows an exemplary synchronization system 100 including a plurality of user devices 102. The user devices may take the form of a variety of different computing devices including a desktop computer, a laptop computer, a mobile communication device, or a personal digital assistant (PDA), among others. As an example, user device 104 may be a desktop computer, user device 106 may be a mobile communication device, and user device 108 may be a laptop computer. A user may employ the user device to access one or more user accounts that may include a variety of information such as an electronic mailbox with a message store (email), calendars, tasks, and contacts.

The synchronization system 100 of FIG. 1 includes a plurality of user accounts 122. The accounts associated with the synchronization system may be synchronized to one or more of user devices 102. In the example of FIG. 1, user device 104, user device 106, and user device 108 are each synchronized with user account 126 and user account 128. As such, a user may access information from both user account 126 and user account 128 from user device 104, user device 106, and/or user device 108. While the synchronization system is described in the context of first and second accounts in this disclosure, it should be understood that any number of accounts may be included in the synchronization system. Further, it should be understood that additional and/or alternative user accounts may be synchronized with additional and/or alternative user devices. In some embodiments, a user account in accordance with the present disclosure may be a Microsoft® Exchange user account.

Such synchronization between plural devices and/or plural user accounts may provide a user with increased functionality and increased convenience. Synchronization between multiple devices allows changes a user makes on one device to be reflected across all devices synchronizing with the changed account. Furthermore, seamless access to two or more different accounts allows a user to keep some account items (e.g., email, contacts, calendars, etc.) separated from other account items. The ability to use two or more user accounts also offers a user the ability to present two or more different network identities to other users. For example, a user may send email from two different email addresses or offer different shared calendars to two or more different sets of contacts.

A user account can be implemented in a variety of different manners without departing from the scope of this disclosure. In some embodiments, a user account can be implemented as a combination of hardware, firmware, software, and/or data, which may be cooperatively configured to deliver the account functionality described herein. In some embodiments, user account data may be remotely stored on a network-accessible server and propagated via complete or partial synchronization to the one or more user devices used to access the user account. In some embodiments, a user account may utilize client-side and/or server-side applications that offer account functionality (e.g., email functionality, address book functionality, calendaring functionality, etc.).

A variety of different services may be configured to offer user accounts in accordance with the present disclosure. Different services can be designed to offer user accounts with different features. As nonlimiting examples, user accounts can be offered with varying levels of security, different amounts of data storage, and/or access to different account operations. For example, one service may be designed to offer business functionality that includes secure email, collaborative calendaring and task management, a shared address book, etc. Another service may be tailored for personal use and may include less functionality in an attempt to simplify operation.

A user may access a user account via a number of techniques while remaining within the scope of this disclosure. In some embodiments, a user may access an account by navigating via a web interface to an online service which provides account functionality via a device connected to the Internet. In other embodiments, a user may access one or more accounts via one or more dedicated applications offered by some services. A dedicated application may provide the user with alternative or additional functionality. Which method is employed to access the account may depend on the offerings of the service, the preferences of a user, and/or the form of the user device. Further, a dedicated application may vary by device (e.g., a laptop may have a different application for accessing an account than a mobile communication device).

Figure 2:
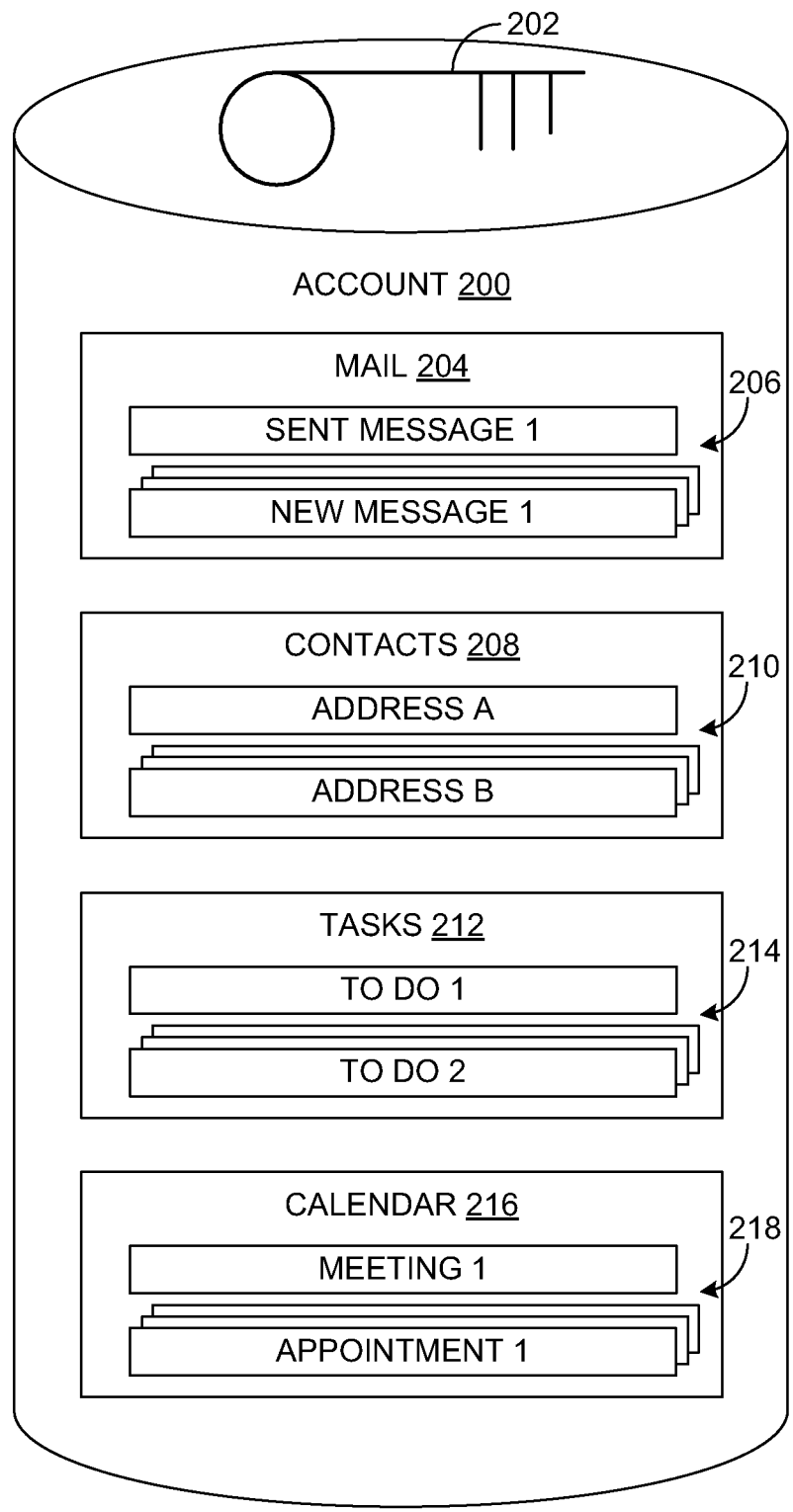
FIG. 2 shows an example of a user account including a number of account items.

One or more user accounts can be organized in a manner such that they are sub-accounts of a common account. Each sub-account may include a plurality of account items. FIG. 2 schematically shows an example of a common user account 200 that includes a mail sub-account 204 with mailbox items 206 (e.g., "sent message 1"), a contacts sub-account 208 with contact items 210 (e.g., "address A"), a tasks sub-account 212 with task items 214 (e.g., "to do 1"), and a calendar sub-account 216 with calendar items 218 (e.g., "meeting 1"). While schematically shown in FIG. 2, it is to be understood that such account items may be saved on one or more computing devices in one or more formats. As described in more detail below, such account items may be saved on a network-accessible server, with which one or more user devices may synchronize. As such, a user may employ a plurality of different user devices to access account items, and changes made to the account from one device may be synchronized across all user devices configured to utilize the account.

Access to a user account can be restricted, wherein access is contingent upon validation of an access credential for each user account. An access credential may take the form of a username and password, a digital certificate, or the like. If an account is organized such that a number of sub-accounts make up a common account, the same access credential may be used to access all sub-accounts. As an example, account 200 in FIG. 2 is comprised of four sub-accounts, access to which may be contingent on validation of a single access credential 202.

Additionally, a user may wish to access two or more different accounts, which may be offered by two or more different services. Access to the accounts may be made contingent on validation of a single shared access credential further increasing convenience for the user, as described in more detail below.

Turning back to FIG. 1, the synchronization system 100 includes at least two accounts, aspects of which may be stored on a network-accessible server 120. The accounts within the synchronization system may have access to a library of operations 110. The library of account operations, as illustrated in FIG. 1, includes a plurality of account operations including operation 112 (e.g., send), operation 114 (e.g., fetch), operation 116 (e.g., search), and operation 118 (e.g., reply), among others. Account operations may be executed at the user device and/or at the server where account data is stored, and/or account operations may be used to facilitate communication between different aspects of the synchronization system. As used herein, accounts with direct access to the library of account operations 110 are described as "in-service".

Account 126 and account 128 in FIG. 1 are in-service accounts, as they both have access to the library of operations 110. Access to the library of operations 110 may be contingent on validation of a shared access credential 124 (e.g., a shared user name and a shared password). In other words, each account may use the same access credential 124 so that a user can effectively "log in" to both accounts at the same time. The user need not separately enter access credentials for both accounts each time the user wishes to log in to the accounts. In some embodiments, each account may have an individual access credential, and the synchronization system may include a master keychain where all such individual access credentials are managed. In this way, a master access credential may be supplied to the master keychain, thus effectively opening access to all accounts to which the master keychain manages the individual access credentials.

Account 136 does not have access to the library of operations 110; thus, it is an out-of-service account. Access to the out-of-service account 136 is contingent on validation of a separate access credential 134.

In addition, an account within the synchronization system may be native or normative. For example, account 126 may be a native account with access to the library of operations 110 and having one or more sub-accounts (e.g., email, calendar, tasks, and contacts). Account 128 may be a normative account, with one or more of the same sub-accounts and features as account 126; one or more of those sub-accounts and/or features derived from a different account (e.g., an out-of-service account 136). The out-of-service access credential 134 for the out-of-service account 136 may be stored in the system and automatically validated once the shared access credential 124 is validated.

A normative account 128 may be endowed with the library of operations 110, thus making it an in-service account with at least some of the features offered by native in-service accounts. In this way, out-of-service accounts with relatively less functionality can be endowed with increased functionality. Furthermore, in this way, out-of-service accounts can be translated for use with the same applications, interfaces, and/or services used to access in-service accounts, thus providing users with a consistent and familiar experience.

In the synchronization system 100 of FIG. 1, each in-service user account with access to the library of operations 110 is assigned a unique identifier, such as a globally unique identifier (GUID). Account items may be retrieved from an in-service account using in-service account operations configured to identify that in-service account with its unique identifier.

A GUID is a 128-bit randomly generated number. Because of the vast number of possible GUIDs (i.e., $3.4 \times 10^{38}$), it is severely unlikely that the same number will be randomly assigned to two different user accounts in the same synchronization system. A testing module may be implemented to check newly assigned GUIDs against other GUIDs in the same synchronization system to eliminate this very small risk. In some embodiments, there may be two or more layers of GUIDs. For example, an account may have a client-side GUID and a server-side GUID. The client-side GUID for the account may be different for each device (i.e., it is only used by one device), while the server-side GUID for the same account may be the same across all servers and devices. In further embodiments, a unique identifier other than a GUID may be used.

In the example of FIG. 1, account 126 is assigned a GUID 130 and account 128 is assigned a GUID 132. Each of the account operations (e.g., operation 112, operation 114, operation 116, operation 118, etc.) in the library of operations 110 may be configured to utilize the respective GUID when addressing an account. For example, if an email is sent from account 126 with a user device 106, the operations used to send the email use GUID 130. Thus, the GUID identifies from which account the email is to be sent and the operation may be synchronized across all devices in the synchronization system. As such, all user devices synchronized with account 126 may reflect that an email was sent from account 126.

The library of operations 110 may additionally include an auto-discover operation. The auto-discover operation is configured to return information for all available accounts (i.e., the auto-discover operation automatically determines account configuration settings), including the unique identifier for addressing each account. Account information that is returned may be displayed in a shared table as described in more detail below.

In the absence of the auto-discover operation, a user manually enters account information for each account in order to successfully synchronize an account to a new device. The auto-discover operation offers the user increased convenience when transitioning from one user device to another. For example, a user may access a plurality of synchronized user accounts via a laptop at home. Outside of the home, the user may use a mobile communication device to access the same accounts. Upon validation of the shared access credential for the plurality of user accounts, the auto-discover operation recreates the same settings and synchronization relationships on the mobile communication device as the laptop computer. In the same manner, the auto-discover operation allows a user to easily synchronize a new device to the synchronization system.

The inclusion of a unique identifier with all account operations allows two or more different accounts to be utilized by the same user on the same device with the same application or interface. Further, the inclusion of the unique identifier with all account operations and the identification of the different accounts with different unique identifiers allows two or more different accounts to be managed under the same access credentials.

In some embodiments, different account items for each account may be aggregated in different tables corresponding to different accounts. In other embodiments, a device synchronized with one or more user accounts may aggregate different account items for those accounts in a shared table. Account items (e.g., contact items, calendar items, task items, mailbox items, etc.) for different accounts may be combined in a shared table, which includes a field for the unique identifier of the account to which that item belongs. FIG. 3, for example, shows a shared table 300 of account items. The first and second columns 302 in table 300 list the different account items for a plurality of different user accounts. Column 304 lists the corresponding unique identifier for each account item (e.g., "sent message 1" has GUID "132").

In some embodiments, one or more aspects of an account may be saved independently of corresponding aspects from another account. For example, mailbox items from two separate accounts can be saved in two separate message stores. Even if some aspects are saved separately, other aspects may be saved in a shared table. For example, even if mailbox items are saved in separate message stores, contact items and/or calendar items from two or more accounts may be stored in a shared table.

Figure 4:
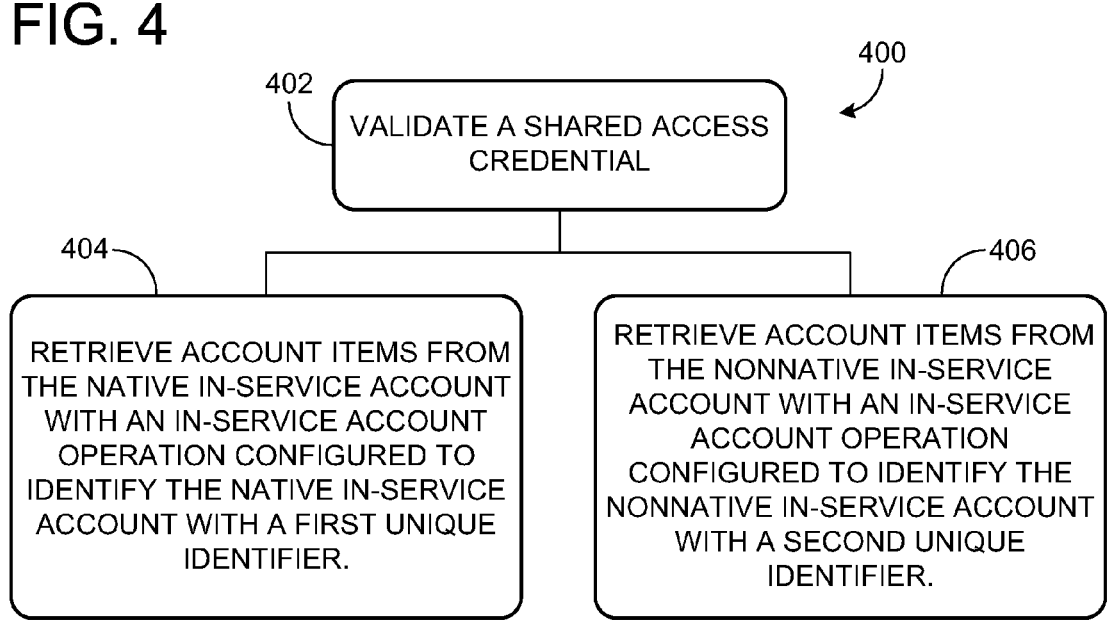
FIG. 4 shows an example method of synchronizing a native in-service account and a normative in-service account derived from an out-of-service account to a same device.

FIG. 4 shows a nonlimiting example of a method 400 of synchronizing a native in-service account and a normative in-service account derived from an out-of-service account to a same device. At 402, method 400 includes validating a shared access credential to open access to both the native in-service account and the normative in-service account. At 404, method 400 includes retrieving account items from the native in-service account with an in-service account operation configured to identify the native in-service account with a first unique identifier. At 406, method 400 includes retrieving account items from the normative in-service account with an in-service account operation configured to identify the normative in-service account with a second unique identifier.

Figure 5:
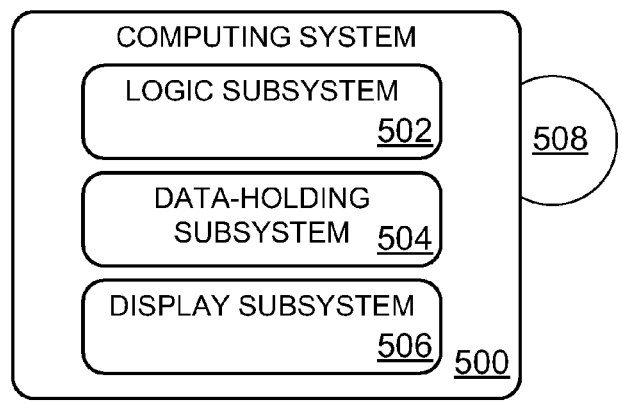
FIG. 5 schematically shows a computing system in accordance with the present disclosure.

In some embodiments, the above described methods, processes, user accounts, and account operations may be tied to a computing system. As an example, FIG. 5 schematically shows a computing system 500 that may perform one or more of the above described methods and processes. Computing system 500 includes a logic subsystem 502 and a data-holding subsystem 504. Computing system 500 may optionally include a display subsystem and/or other components not shown in FIG. 5.

Logic subsystem 502 may include one or more physical devices configured to execute one or more instructions. For example, the logic subsystem may be configured to execute one or more instructions that are part of one or more programs, routines, objects, components, data structures, or other logical constructs. Such instructions may be implemented to perform a task, implement a data type, transform the state of one or more devices, or otherwise arrive at a desired result. The logic subsystem may include one or more processors that are configured to execute software instructions. Additionally or alternatively, the logic subsystem may include one or more hardware or firmware logic machines configured to execute hardware or firmware instructions. The logic subsystem may optionally include individual components that are distributed throughout two or more devices, which may be remotely located in some embodiments.

Data-holding subsystem 504 may include one or more physical devices configured to hold data and/or instructions executable by the logic subsystem to implement the herein described methods and processes. When such methods and processes are implemented, the state of data-holding subsystem 504 may be transformed (e.g., to hold different data). Data-holding subsystem 504 may include removable media and/or built-in devices. Data-holding subsystem 504 may include optical memory devices, semiconductor memory devices, and/or magnetic memory devices, among others. Data-holding subsystem 504 may include devices with one or more of the following characteristics: volatile, nonvolatile, dynamic, static, read/write, read-only, random access, sequential access, location addressable, file addressable, and content addressable. In some embodiments, logic subsystem 502 and data-holding subsystem 504 may be integrated into one or more common devices, such as an application specific integrated circuit or a system on a chip.

FIG. 5 also shows an aspect of the data-holding subsystem in the form of computer-readable removable media 508, which may be used to store and/or transfer data and/or instructions executable to implement the herein described methods and processes.

When included, display subsystem 506 may be used to present a visual representation of data held by data-holding subsystem 504. As the herein described methods and processes change the data held by the data-holding subsystem, and thus transform the state of the data-holding subsystem, the state of display subsystem 506 may likewise be transformed to visually represent changes in the underlying data. Display subsystem 506 may include one or more display devices utilizing virtually any type of technology. Such display devices may be combined with logic subsystem 502 and/or data-holding subsystem 504 in a shared enclosure, or such display devices may be peripheral display devices.

It is to be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The specific routines or methods described herein may represent one or more of any number of processing strategies. As such, various acts illustrated may be performed in the sequence illustrated, in other sequences, in parallel, or in some cases omitted. Likewise, the order of the above-described processes may be changed.

The invention claimed is:

1. A synchronization system, comprising:
a library of account operations;
a first native account having a first mailbox assigned a first globally unique identifier, the first native account an in-service account having direct access to the library of account operations, one or more such account operations configured to identify the first mailbox with the first globally unique identifier; and
a second normative account having a second mailbox assigned a second globally unique identifier, the second normative account derived from an out-of-service account without native access to the library of account operations, the second normative account endowed with the library of account operations, one or more such account operations configured to identify the second mailbox with the second globally unique identifier,
access to both the first native account and the second normative account being contingent on validation of a shared username and a shared password that allow both accounts to be accessed responsive to a single validation of the shared username and the shared password, the single validation of the shared username and shared password automatically validating an out-of-service access credential for the out-of-service account to open access to the out-of-service account via the second normative account, the out-of-service access credential being different than the shared password.

2. The synchronization system of claim 1, where the library of account operations includes an auto-discover operation configured to return all available accounts, and for each available account, a globally unique identifier for accessing that account.

3. The synchronization system of claim 1, where the first native account includes a first message store identified by the first globally unique identifier and the second normative account includes a second message store identified by the second globally unique identifier.

4. The synchronization system of claim 1, where account items for the first native account and account items for the second normative account are combined in a shared table.

5. The synchronization system of claim 4, where the shared table includes, for each account item, a field for a globally unique identifier of an account to which that account item belongs.

6. The synchronization system of claim 5, where account items include one or more of contact items, calendar items, or task items.

7. A synchronization system, comprising:
a first account assigned a first unique identifier, access to the first account being contingent on validation of a shared access credential;
a second account assigned a second unique identifier, access to the second account also being contingent on validation of the shared access credential, where account items for the first account and account items for the second account are combined in a shared table that includes, for each account item, a field for a unique identifier of an account to which that account item belongs; and
a library of account operations, one or more account operations configured to utilize the first unique identifier when addressing the first account, and one or more account operations configured to utilize the second unique identifier when addressing the second account.

8. The synchronization system of claim 7, where each unique identifier is a globally unique identifier.

9. The synchronization system of claim 7, where the shared access credential includes a shared username and a shared password.

10. The synchronization system of claim 7, where the library of account operations includes an auto-discover operation configured to return all available accounts, and for each available account, a unique identifier for accessing that account.

11. The synchronization system of claim 7, where the first account includes a first message store identified by the first unique identifier and the second account includes a second message store identified by the second unique identifier.

12. The synchronization system of claim 7, where account items include one or more of contact items, calendar items, or task items.

13. The synchronization system of claim 7, where the first account is a native in-service account and the second account is a normative in-service account derived from an out-of-service account.

14. The synchronization system of claim 13, where access to the second account is further contingent on validation of an out-of-service access credential different than the shared access credential.

15. A data-holding subsystem holding instructions executable by a logic subsystem to implement a method of synchronizing a native in-service account and a normative in-service account derived from an out-of-service account to a same device, the method comprising:
validating a shared access credential to open access to the native in-service account;
responsive to validating the shared access credential, automatically validating an out-of-service access credential for the out-of-service account to open access to the out-of-service account via the normative in-service account, the out-of-service access credential being different than the shared access credential;
retrieving account items from the native in-service account with an in-service account operation configured to identify the native in-service account with a first unique identifier; and
retrieving account items from the normative in-service account with an in-service account operation configured to identify the normative in-service account with a second unique identifier.

16. The data-holding subsystem of claim 15, where instructions executable by the logic subsystem to implement the method are held on computer-readable removable media.

17. The data-holding subsystem of claim 15, where the first unique identifier and the second unique identifier are different globally unique identifiers.

18. The synchronization system of claim 1, wherein mailbox items from both the first mailbox and the second mailbox are concurrently displayed in a same user interface.

* * * * *